United States Patent [19]

Savage

[11] 4,199,237
[45] Apr. 22, 1980

[54] LOW SCENE BRIGHTNESS INDICATOR FOR USE IN A PHOTOGRAPHIC CAMERA

[75] Inventor: Thomas J. Savage, Randolph, Mass.

[73] Assignee: Polaroid Corporation, Cambridge, Mass.

[21] Appl. No.: 846,177

[22] Filed: Oct. 27, 1977

[51] Int. Cl.² ............................................. G03B 17/20
[52] U.S. Cl. ................................... 354/60 E; 354/53; 354/57; 354/61; 354/289
[58] Field of Search ........................ 354/39, 53, 54, 55, 354/56, 57, 60 R, 60 E, 61, 289

[56] References Cited

U.S. PATENT DOCUMENTS

| | | | |
|---|---|---|---|
| 3,220,326 | 11/1965 | Scudder | 354/60 E |
| 3,224,350 | 12/1965 | Stimson | 354/60 E |
| 3,303,494 | 2/1967 | Taylor et al. | 340/373 |
| 3,540,038 | 7/1969 | Taylor | 340/373 |
| 3,789,395 | 1/1974 | Michels | 340/373 R |
| 3,810,207 | 5/1974 | Mudler | 352/141 |
| 3,855,601 | 12/1974 | Uchiyama et al. | 354/31 |
| 3,979,747 | 9/1976 | Candida | 340/373 |
| 4,007,469 | 2/1977 | Land et al. | 354/27 |
| 4,015,255 | 3/1977 | Wood | 340/373 |
| 4,027,317 | 5/1977 | Hauser et al. | 354/289 |

Primary Examiner—Russell E. Adams
Attorney, Agent, or Firm—Francis J. Caufield

[57] ABSTRACT

A photographic camera of the type having distinct ambient and flash exposure modes of operation is provided with a low power consuming, low scene brightness detecting and indicating apparatus by which a visual signal is displayed in the camera's viewfinder to alert the camera user of the presence of a low scene brightness condition requiring that the camera be used in its flash exposure mode of operation with an artificial light source to illuminate the scene.

18 Claims, 4 Drawing Figures

LOW SCENE BRIGHTNESS INDICATOR FOR USE IN A PHOTOGRAPHIC CAMERA

BACKGROUND OF THE INVENTION

1. Field of the Invention

This invention relates to photography, and, more particularly, to photographic apparatus for use in cameras of the type having distinct ambient and flash exposure modes of operation to measure scene brightness and provide the photographer with a signal which alerts him to the presence of a low scene brightness condition requiring that the camera be used in its flash mode of operation.

2. Description of the Prior Art

It is generally well known among photographers that the ambient light reflected from a scene to be photographed may be insufficient to take a sharp acceptably exposed picture without using a source of artificial illumination such as a photoflash lamp or strobe light. This is true for cameras which have manual shutters as well as for those which have automatic exposure control systems which have present programs of aperture and time that vary with scene brightness.

Determining exactly when it is too dark, however, is a fairly complex process which involves a consideration of such factors as film speed, camera exposure delivery capability, and the shutter speed at which camera motion is likely to cause blurred pictures. The relationships between these important factors and the brightness of the photographic scene may be correlated with the aid of a scene light brightness measuring device (light meter) to determine when it is necessary to use an auxiliary light source to avoid underexposed or blurred pictures or both.

Those skilled in the photographic arts have recognized the problem associated with determining when there is adequate ambient scene brightness and have provided scene light measuring apparatus by which a photographer is alerted that a scene brightness condition exists which will cause exposure problems.

For example, in U.S. Pat. No. 3,810,207 issued to Arthur Z. Mueller on May 7, 1974 and entitled "Exposure Control System", the patentee discloses a camera exposure control system which provides the photographer with a visual signal in the camera viewfinder that either an overexposure or underexposure condition exists. The exposure control system of this patent includes an exposure meter having light sensing means, such as a photocell, and drive means, such as a galvanometer. The light sensing and drive means are coupled in a manner which moves the drive means in relation to the intensity of the light sensed in the field of view of the camera. A lens system is included which defines an optical axis for the camera. Iris blade means are arranged to be driven across the optical axis between selected first and second positions. The blade means define an aperture means having a configuration which varies from a minimum to a maximum area so that the amount of light through the lens system is varied as the blade moves between the first and second positions. The aperture means is also arranged to maintain the minimum and maximum exposure areas for the lens system as the meter drive moves the blades a predetermined distance beyond the established first and second positions. Suitable indicia means are coupled to the blades to register overexposure when one of the blades moves beyond the second position and underexposure when another of the blades moves beyond the first position. No provision is made for taking flash pictures, and the exposure control system is only operative when the user depresses a switch which electrically connects the system to an electronic storage battery.

Another example is found in U.S. Pat. No. 3,855,601 issued to Takashi Uchiyama et. al. on Dec. 17, 1974 and entitled "Photometer". Here, the patentees provide a camera with a photometer capable of indicating the necessity of switching from a natural light exposure mode to a flash exposure mode or of automatically switching from the natural light exposure mode to the flash exposure mode, when the brightness of a portion of the field of view containing the object to be photographed becomes lower than that of the remaining field of view by more than a predetermined difference, regardless of the general level of brightness. This apparatus is relatively complex because of all the functions and decisions it is called upon to make and, as well, is only operative in response to the actuation of a multi-step camera actuating button.

A further example is described in U.S. Pat. No. 4,007,469 issued to Edwin H. Land et. al. on Feb. 8, 1977 and entitled "Photographic Apparatus with Plurality of Selectively Determinable Operational Modes". Here, the patentees disclose a camera having a viewfinder in which there is a plurality of selectively illuminable indicators, each responsive to a different set of conditions to produce an indication that the photographer should do something else in order to produce the correct exposure. A rather complex electronic circuit is provided for sensing the state of charge of a flash unit, the ambient light level, and a pair of shutter buttons and then indicating to the photographer, via the illuminable indicators, whether or not to make a flash exposure or an ambient light exposure, or displaying an appropriate indication to the operator of what to do next. The apparatus of this disclosure is also rather complicated because of its multi-functional nature and is not designed to be continuously on to determine the state of the ambient brightness level.

Therefore, it is a primary object of the present invention to provide a simple low scene brightness indicator for use in a camera to alert a photographer of the presence of a scene brightness condition which requires the use of a flashlamp or the like to get sharp adequately exposed photographs.

It is another object of the present invention to provide a low scene brightness indicator which continuously monitors the brightness of a photographic scene without operator intervention so long as the apparatus is connected with an appropriate power source.

It is another object of the present invention to provide a low scene brightness indicator having low power consumption characteristics which enable it to continuously monitor scene brightness levels over a relatively long period of time.

Other objects of the invention will in part be obvious and will in part appear hereinafter. The invention accordingly comprises the apparatus possessing the construction, the combination of elements, and arrangement of parts which are exemplified in the following detailed disclosure.

SUMMARY OF THE INVENTION

The present invention relates to a low scene brightness detecting and indicating apparatus in a camera of the type having distinct ambient and flash exposure modes of operation. The apparatus operates to provide the user with a visual signal which alerts him that it is too dark to take sharp well-exposed pictures without using the camera in its flash exposure mode of operation with an artificial light source to illuminate the scene to be photographed.

The camera comprises means for detecting the brightness of at least a portion of a scene to be photographed and providing an electrical output signal having a first characteristic whenever the scene brightness changes from a level below a predetermined reference scene brightness to a level at least equal to the predetermined reference scene brightness and having a second characteristic whenever the scene brightness changes from a level above the predetermined reference scene brightness to a level at least equal to the predetermined reference scene brightness. The predetermined reference scene brightness level defines a threshold scene brightness value above which the camera should be used in its ambient exposure mode of operation and below which the camera should be used in its flash exposure mode of operation with an artificial light source.

Additionally provided is a bistable magnetic indicator that is electrically energizable by the electrical output signal. The bistable magnetic indicator is mounted to provide a visual signal which indicates to the camera user which of the camera's exposure modes of operation should be used. The magnetic indicator is mounted with the camera for movement between a first stable position which indicates to the user that the camera should be used in its flash exposure mode of operation with an artificial light source and a second stable position which indicates that the camera can be used in its ambient exposure mode of operation. The magnetic indicator is moved into its first stable position in response to the electrical output signal when it has its second characteristic and into its second stable position in response to the electrical output signal when it has its first characteristic.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein;

DESCRIPTION OF THE PREFERRED EMBODIMENT

Figure 1:
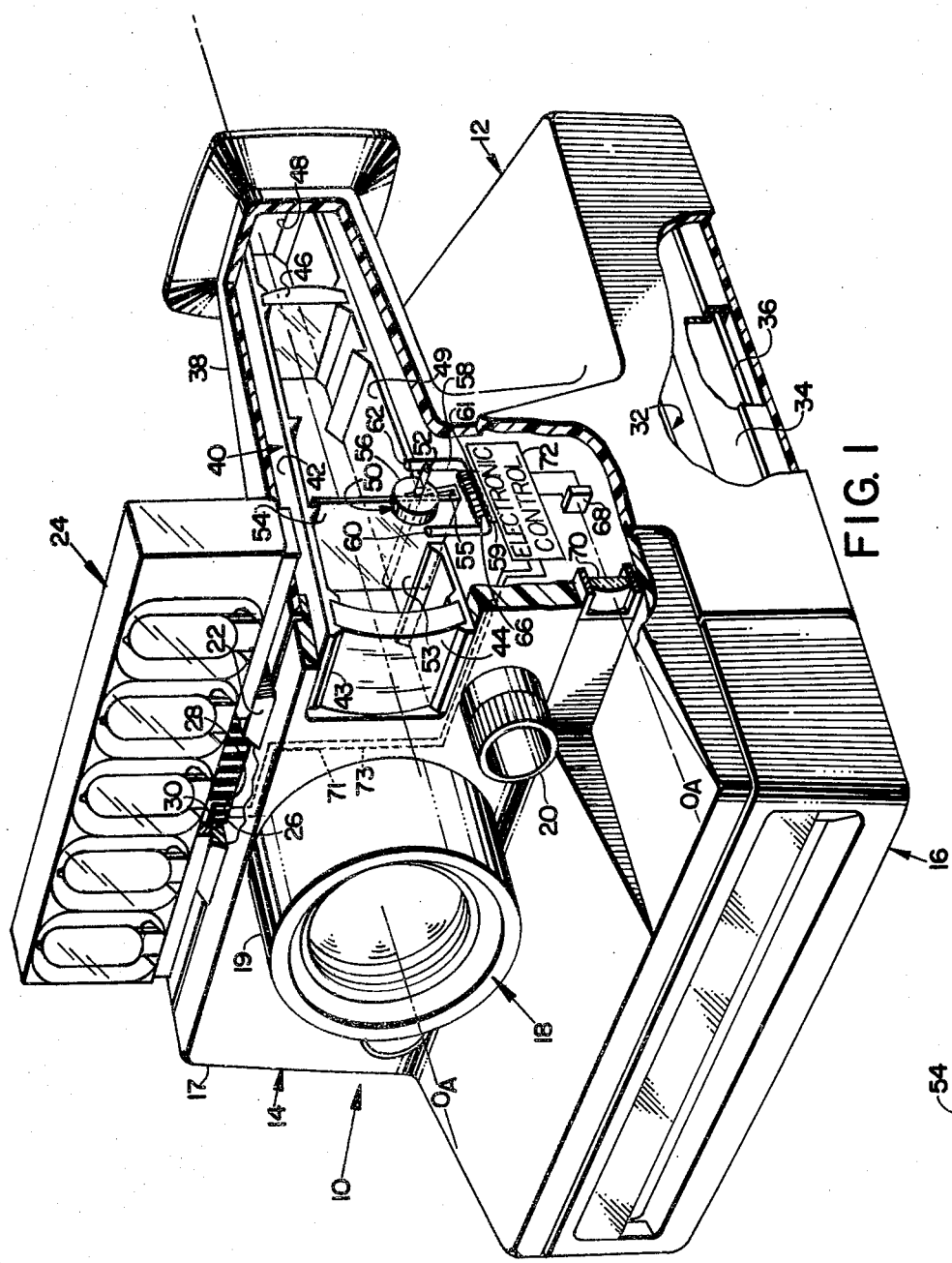
FIG. 1 is a perspective view with parts broken away of a camera embodying the present invention.

Referring now to FIG. 1, there is shown a camera designated at 10 in which the present invention is incorporated.

The camera 10 is preferably a rigid body or box type camera and comprises a body 12, a front cover 14, and a door 16 which interconnect to define its outward appearance and serve as a protective enclosure for housing its interior components. The body 12, the front cover 14, and the door 16 are preferably fabricated of an opaque plastic using injection molding techniques in order to simplify their manufacture and reduce costs.

Located in a vertical forward wall 17 of the front cover 14 is a photographic objective taking lens 18 having an optical axis, OA, therethrough. The objective taking lens 18 is preferably a Cooke triplet or similar multi-element type of lens which may have its focal length changed by adjusting the axial air spacing between its optical elements. This may be accomplished in a well-known manner by rotating a bezel, such as that designated at 19, coupled with a screw-threaded lens mount (not shown).

Also located in the vertical forward wall 17 is an optical system 20 which is preferably used for collecting radiation in a selective manner from a photographic scene and directing the collected radiation onto a phototransducer (not shown) which, in turn, may be utilized to generate an output signal whose magnitude varies in accordance with the brightness of the photographic scene.

Generally designated at 22 is a well-known flash socket that is adapted to receive a linear photoflash array 24 which is also of a well-known type. Such a flash socket is described in considerable detail in, for example, U.S. Pat. No. 3,757,643 issued to John P. Burgarella on Sept. 11, 1973 and entitled "Photoflash Apparatus".

Included in the flash socket 22 are a pair of switch contacts 26 and 28 spaced apart to be normally open circuited. The linear flash array 24 includes a blade-like conducting strip 30 which contacts the switch contacts, 26 and 28, to provide an electrically conducting path between the switch contacts, 26 and 28, when the flash array 24 is inserted into the flash socket 22 (see FIG. 1). The purpose for shorting the contacts 26 and 28 will be explained more fully in the following discussion.

The camera 10 may be provided with a well-known electronic exposure control system by which a photographer may take pictures in either an ambient exposure mode of operation or a flash exposure mode of operation. In the ambient exposure mode of operation, available natural light is used as the source for illuminating the photographic scene and, in the flash exposure mode of operation, an artificial light source, such as the linear flash array 24, serves as the source for illuminating the photographic scene. A representative exposure control system which may be used to provide the camera 10 with its ambient and flash exposure modes of operation is described in detail in U.S. Pat. No. 4,035,813 issued to George D. Whiteside on July 12, 1977 and entitled "Exposure Control System for Selectively Determining Exposure Interval".

Located in the base of the body 12 is a well-known film cassette receiving chamber 32 that is adapted to hold a film cassette, such as that designated at 34, in position for exposure through the objective taking lens 18. The film cassette 34 is preferably of the type which includes a stacked array of self-processable type film units. Located in the base of the film cassette 34 is a rectangular flat thin battery 36 which may be used to supply power to the various electrical components of the camera 10. An example of such a film cassette is disclosed and described in detail in U.S. Pat. No. 3,872,487 issued to Nicholas Gold on Mar. 18, 1975 and entitled "Photographic Film Assemblage and Apparatus".

Extending rearwardly from the body 12 is an elongated hollow portion 38 of the body 12 in which is disposed a viewfinder 40. The viewfinder 40 is of the reversed Galilean type having an elongated eye relief aperture to improve magnification. Included in the viewfinder 40 is a viewfinder housing 42 which supports the various optical components of the viewfinder 40 and is configured to have an exterior geometry which is complementary to the interior geometry of the elongated viewfinder body portion 38. The rear end of the viewfinder housing 42 is supported at the rear end of the body portion 38 while its forward end is supported in a complementary configured aperture 43 located in the front cover 14.

The optical components of the viewfinder 40 comprise a negative lens 44 for forming a virtual image of a scene to be photographed and a positive eye lens 46 which is focused on the image plane of the negative lens 44 so that the virtual image may be observed. Spaced behind the positive eye lens 46 is an eye relief aperture 48 that is located at the rear end of the body portion 38. Those skilled in the art will recognize that the optical characteristics of the negative lens 44, the positive eye lens 46 and the spacing between these optical elements and the eye relief aperture 48 may be chosen so that the field of view of the viewfinder 40 may be made to be generally coextensive with the field of view of the camera 10. In this manner, viewfinder means are provided for the camera 10 which allow a photographer to aim the camera 10 so that the subject matter of the picture to be photographed may be framed within the field of view of the viewfinder 40.

Mounted on a bottom wall 49 of the viewfinder housing 42 is a bistable magnetic indicator 50 which, as will be seen, provides the photographer with a visual indication of which of the exposure modes of operation of the camera 10 to use. The bistable magnetic indicator 50 comprises an axle 52 which is disposed for rotation across an aperture 53 located in the bottom wall 49 of the viewfinder housing 42. As can be seen from FIG. 1, the aperture 53 is located between the positive eye lens 46 and the negative lens 44. The axle 52 is mounted in any conventional manner across the aperture 53 and transverse to the optical axis of the viewfinder 40 so that it freely rotates about it longitudinal axis.

Rigidly affixed to the axle 52 is a transparent flag 54 which rotates in conjunction with the rotation of the axle 52. The transparent flag 54 is preferably molded of a suitable plastic material which is preferably red in color. In its position shown in FIG. 1, the flag 54 occupies the entire field of view of the viewfinder 40. The density of the transparent flag 54 is preferably chosen so that the photographic scene can be observed through the viewfinder 40 when the ambient brightness level is relatively low (average room brightness) and the flag is in its position as illustrated in FIG. 1.

Figure 4:
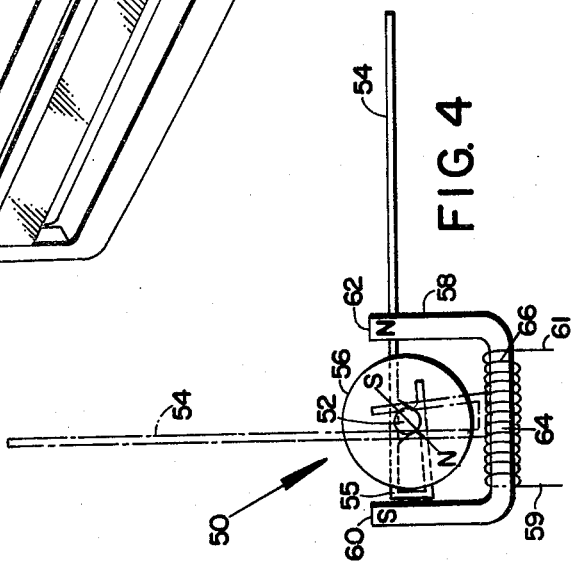
FIG. 4 is a side elevational view illustrating two positions of a portion of the invention.

As best seen in FIG. 4 the transparent flag 54 includes a bent over base portion 55 which functions as a counterbalance to the upper portion of the flag 54 located above the axle 52.

Also included in the bistable magnetic indicator is a permanent magnet 56 which is rigidly affixed to one end of the axle 52. The permanent magnet 56 is disposed between a U-shaped ferromagnetic core 58 preferably formed of a material having a high magnetic retentivity. The U-shaped ferromagnetic core 58 includes a pair of free end portions, 60 and 62, respectively, and a base portion 64 around which is disposed a coil 66 for establishing the polarity of the free ends, 60 and 62. With this arrangement, the permanent magnet 56 is mounted between the free ends, 60 and 62, of the core 58 for rotation in conjunction with the axle 52 which is perpendicular to the plane of the core 58. Since the permanent magnet 56 carries the flag 54, the flag 54 may be positioned in or out of the field of view of the viewfinder 40 in accordance with the polarity of the free ends, 60 and 62, of the core 58.

The polarity of the free ends, 60 and 62, of the U-shaped core 58 is established by the direction of a current pulse which is fed into a pair of leads 59 and 61 that form a continuation of the coil 66. The leads, 59 and 61, are connected to an electronic control circuit generally designated as 72 which, among other things, provides the current pulses to change the state of the bistable magnetic indicator 50.

The bistable magnetic indicator 50 is preferably of the type which requires only a single current pulse to effect a switch in the polarity of the free ends 60 and 62. The polarity thereafter is maintained once the switching current pulse is removed. This polarity then may be changed to an opposite polarity by the application of another current pulse having a different direction. For a detailed description of a bistable magnetic device which is representative of the bistable magnetic indicator 50, referrence may be had to U.S. Pat. No. 3,540,038 issued to M. K. Taylor et. al. on July 31, 1969 and entitled "Multi-Color Single Axis Magnetically Actuated Display or Indicating Element".

Referring again to FIG. 1, there is shown an optical element 70 located in the vertical forward wall 17 of the front cover 14. Located behind the optical element 70, along an optical axis, OA, thereof is a photodiode 68. The purpose of the optical element 70 is to collect radiation from a select portion of the scene to be photographed and direct it onto the surface of the photodiode 68. The photodiode 68 in turn converts the light energy incident on its surface to an electrical output signal whose magnitude varies as a function of the intensity of the scene brightness. The output signal of the photodiode 68 is fed into the electronic control 72 where it is utilized in a manner to be subsequently described.

Also connected to the electronic control 72 via a pair of lines, 71 and 73, are the switch contacts, 26 and 28, respectively.

Figure 2:
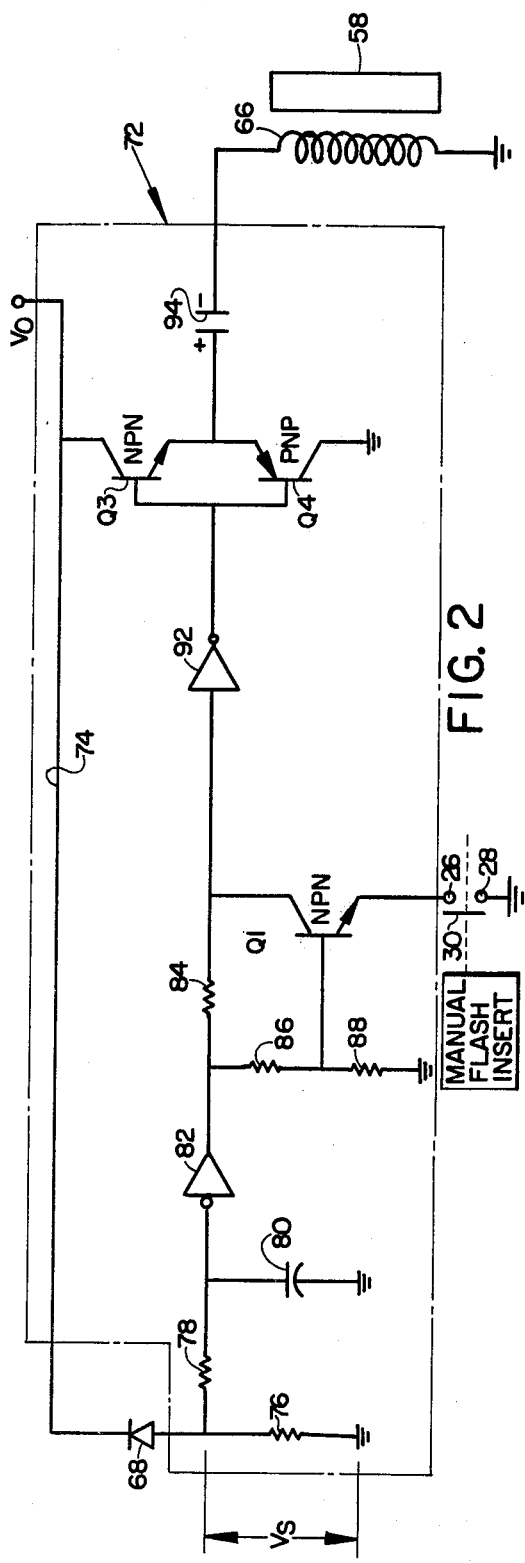
FIG. 2 is a schematic of a circuit which forms part of the present invention.

Turning now to FIG. 2 there is shown a schematic diagram for the circuitry of the electronic control 72 of this invention. The voltage required to operate the control circuit 72 and its associated elements may be derived from the battery 36 of the cassette 34 in a well-known manner. As an example, reference may be had to U.S. Pat. No. 3,705,537 issued to Richard Paglia on Dec. 12, 1972 and entitled "Apparatus for Interfacing Photographic Camera and Film Cartridge". The DC voltage of the battery 36 is connected between the terminal labeled $V_0$ and ground.

The photodiode 68 has its cathode connected to $V_0$ via a power line 74 and its anode connected to ground via a resistor 76. The anode of the photodiode 68 is also connected to the input of a level detector in the form of a Schmidt trigger 82 via a resistor 78.

Figure 3:
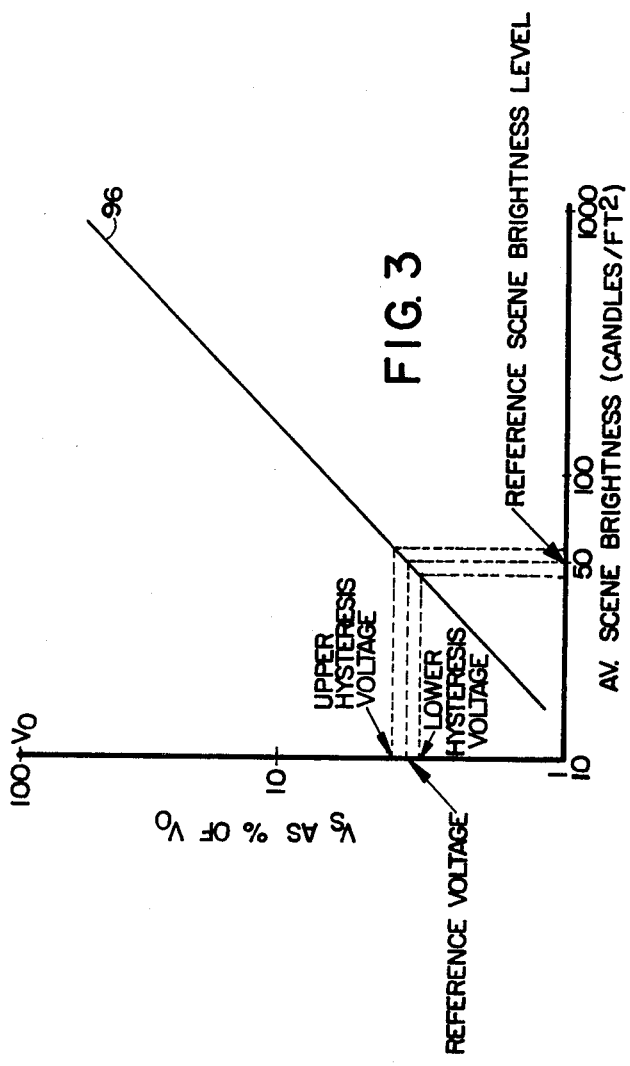
FIG. 3 is a graph illustrating the variation in voltage of part of the circuit of FIG. 2 as a function of scene brightness.

Connected in this mode of operation, the photodiode 68 operates in a reversed biased manner to produce a current output which is linearly proportional to the intensity of the scene brightness as seen through the optical element 70. The current output of the photodiode 68 produces an IR drop, $V_S$, across the resistor 76 (see FIG. 2). The voltage, $V_S$, which provides the input signal to the Schmidt trigger 82, also varies linearly in correspondence with scene brightness. Curve 96 of FIG. 3 shows the variation of $V_S$ with average scene brightness where $V_S$ is expressed as a percentage of $V_O$ and average scene brightness is in units of candles/ft$^2$. With this arrangement, the voltage across the resistor 78 provides a continuous input to the Schmidt trigger 82 so long as the photodiode 68 is coupled to $V_O$.

The IR drop across the resistor 76 may be changed in accordance with the value of the resistor 76 so as to match the input requirements of the Schmidt trigger 82. Consequently the graph of FIG. 3 should be considered as illustrative of the type of variation in voltage which can be achieved using the arrangement thus far described. The absolute voltage, $V_S$, will be a function of the particular characteristics of the photodiode chosen and the value of the resistor 76.

The photodiode 68 is preferably a silicon type which has the advantage of relatively fast response time, short memory, excellent linearity together with ready adaptability to convenient shapes and sizes. In addition, the spectral sensitivity of silicon can be readily controlled by appropriate color correction filters (not shown) to provide a photopic sensitivity if desirable.

Connected between the input of the Schmidt trigger 82 and ground is a low-frequency band pass filter comprising a capacitor 80 and the resistor 78 which cooperate with each other in a well-known manner to filter out low frequency noise which may be associated with the output signal of the photodiode 68.

The Schmidt trigger 82 is preferably a CMOS-IC having a high input impedance and a low output impedance and low power consumption characteristics.

The Schmidt trigger 82 is arranged to provide an output signal of opposite polarity to the input signal to provide a high output voltage signal (logic 1) at its output terminal whenever the average scene brightness changes from a value above a predetermined reference scene brightness level to a level at least equal to the predetermined reference scene brightness level, and a low output voltage signal (logic 0) whenever the scene brightness changes from a level below the predetermined reference scene brightness level to a level at least equal to the predetermined reference scene brightness level. The predetermined reference scene brightness level defines a scene threshold brightness above which the camera 10 should be used in its ambient exposure mode of operation and below which it should be used in its flash exposure mode of operation with an artificial source of illumination such as the linear flash array 24.

As illustrated in FIG. 3 there is a reference voltage which corresponds to the predetermined reference scene brightness level which defines the set point for the Schmidt trigger 82. For illustration purposes FIG. 3 indicates that the reference scene brightness level is 50 candles per square foot. However, it is obvious that the reference scene brightness level may be chosen to fit the particular circumstances of the camera with which the invention is to be used.

The Schmidt trigger 82 inherently includes some hysteresis. The hysteresis of the Schmidt trigger 82 should be chosen so that its triggering is less sensitive to small noise fluctuations in the signal level. If the hysteresis were, for example, ±10% of the reference voltage, as illustrated in FIG. 3, the logic 1 output signal would not be present unless the scene brightness changed from a level above approximately 55 candles per square foot to a level below approximately 45 candles per square foot. Conversely, the logic 0 signal would only be present when the scene brightness changed from a level below approximately 45 candles per square foot to a level above approximately 55 candles per square foot.

The output of the Schmidt trigger 82 is connected to the input of a conventional input inverting power amplifier 92 via a resistor 84. The amplifier 92 is also preferably fabricated as a CMOS-IC and provides a high output signal (approximately $V_O$) whenever the output of the Schmidt trigger 82 provides a logic 0 signal and a low output signal (substantially 0) whenever the output of the Schmidt trigger 82 provides a logic 1 signal.

Connected between the output of the Schmidt trigger 82 and ground is a voltage dividing network comprising a pair of resistors 86 and 88. In common connection to the resistors 86 and 88 is the base of an NPN transistor Q1. The collector of the transistor, Q1, is connected to the output of the Schmidt trigger 82 via the resistor 84, and the emitter of the transistor, Q1, is connected to ground via the switch contacts, 26 and 28, which, as will be recalled, are normally open circuited.

Also provided in the electronic control circuit 72 is a transistor switching network comprising a conventional NPN transistor Q3 and a conventional PNP transistor Q4. The transistors, Q3 and Q4, have their emitters coupled in common and their bases coupled in common. The bases of the transistors, Q3 and Q4, are connected to the output of the amplifier 92 which turns the transistor Q3 on when its output is high and turns the transistor Q4 on when the output is low.

The collector of the transistor, Q3, is connected to $V_O$ via the power line 74 while the collector of the transistor, Q4, is connected to ground.

A capacitor 94 is provided with its positive terminal coupled in common connection with the emitters of the transistors, Q3 and Q4, and its negative terminal coupled with one end of the coil 66. The remaining end of the coil 66 is coupled with ground. The capacitor 94 and the coil 66, thus arranged, enable the capacitor 94 to provide a current pulse through the coil 66 in one direction as the capacitor 94 is charged and a current pulse in the opposite direction as the capacitor 94 is discharged. As will be recalled, it is the direction of the current pulse through the coil 66 which establishes the polarity of the free ends, 60 and 62, of the U-shaped electromagnetic core 58.

Having described the construction of the invention and its control system, its operation will next be described with reference to FIGS. 2 through 4. In describing the operation of the invention, it is to be assumed that the electronic control 72 has been energized by the insertion of a film cassette into the camera 10. It will further be assumed that the average scene brightness level exceeds the reference scene brightness level so that the camera 10 can be operated in its ambient exposure mode of operation and that no artificial source of illumination, such as the linear flash array 24, is inserted into the camera 10. i.e., switch contacts, 26 and 28, are open circuited.

Under these conditions, the electronic control circuit 72 will be in a quiescent state. In this state, the current output of the photodiode 68 will be sufficient to create an IR drop across the resistor 76 which exceeds the reference voltage corresponding to the reference scene brightness level. In this condition, the output of the Schmidt trigger 82 is at a logic 0, and the output of the amplifier 92 is high so as to maintain transistor Q3 in a conductive state. At this time, there will be substantially no current flow through the coil 66 since the capacitor 94 is charged near the level of $V_0$.

In this state, the free ends, 60 and 62, of the U-shaped ferromagnetic core 58 and the permanent magnet 56 are polarized in the manner illustrated in FIG. 4. With the polarities shown in FIG. 4, the flag 54 is biased in a down position as illustrated because of the magnetic torque generated by the differences in the polarities shown. When the flag 54 is in the down position, the photographer is presented with a clear field of view through the viewfinder 40 indicating that the camera should be used in its ambient exposure mode of operation.

When the camera is subjected to a change in the scene brightness from a high level above the reference scene brightness level to a level lower than that of the reference scene brightness level, the electronic control circuit 72 undergoes a transient condition which changes the polarity of the free ends, 60 and 62, of the U-shaped ferromagnetic core 58 thereby causing the sign 54 to assume its position as illustrated in FIG. 1. The transient condition of the electronic control circuit 72 occurs as follows. In going from a scene brightness level in excess of the reference scene brightness level to a scene brightness level below the reference scene brightness level, the current output of the photodiode 68 goes through a transition state from a high level to a low level causing the IR drop across the resistor 76 to pass through the hysteresis voltage zone of the Schmidt trigger 82 (see FIG. 3). When this occurs, the Schmidt trigger 82 produces a logic 1 at its output terminal causing the amplifier 92 to produce a low output voltage. The low output of the amplifier 92, in turn, biases the transistor Q4 on and turns off the transistor Q3. This causes the charged capacitor 94 to discharge through the coil 66 to ground. When this happens a transient current is momentarily caused to flow through the coil 66 from ground to the negative side of the capacitor 94. This current flow through the coil 66 causes the free ends, 60 and 62, of the ferromagnetic coil 58 to change polarity. The polarity assumed by the free ends, 60 and 62, of the ferromagnetic core 58, in response to the transient current thus induced in the coil 66, will be opposite to those illustrated in FIG. 4. This change is polarity in the free ends, 60 and 62, in turn causes a magnetic torque to rotate the sign 54 to its position illustrated in phantom in FIG. 4 and also shown in FIG. 1.

At this instant the capacitor 94 will be substantially discharged, and the current will substantially cease to flow through the coil 66. However, even though substantially no current flows through the coil 66, the bistable magnetic indicator 50 will remain in its second position as illustrated in FIG. 1 because of the high magnetic retentivity of the U-shaped ferromagnetic core 58, and it will remain in this position unit it receives another current pulse in the opposite direction as the capacitor 94 charges. The capacitor 94 will charge to provide the oppositely directed current pulse in response to the transistor Q3 being again turned on by the amplifier 92 assuming a high output voltage and the Schmidt trigger 82 switching back to a logic 0 output when the scene brightness changes from a low brightness level to a high brightness level above the reference scene brightness level.

When the transparent red flag 54 is positioned as shown in FIG. 1, the photographer is informed that the average scene brightness level is below the reference scene brightness level indicating that the camera 10 should be used in its flash exposure mode of operation with an auxilliary source of illumination.

Having been advised that the camera 10 should be used in its flash exposure mode of operation, the photographer then inserts the linear flash array 24 into the flash socket 22. When he does this, switch contacts 26 and 28 will short to connect the emitter of the transistor Q1 to ground. Thus insertion of the flash array 24 into the flash socket 22 causes the transistor Q1 to turn on and conduct. When Q1 is conducting, the logic 1 signal to the input of the amplifier 92 is substantially grounded. The output of the amplifier 92 therefore goes high thereby causing the transistor Q3 to turn on to provide a conductive path between $V_0$ and the positive end of the capacitor 94 and to cause transistor Q4 to turn off. The capacitor 94 then charges to a voltage level substantially equal to $V_0$. Charging of the capacitor 94 in this manner causes a current to flow from the negative end of the capacitor 94 through the coil 66 to ground. This transient current, in turn, reverses the polarity of the free ends, 60 and 62, of the U-shaped ferromagnetic core 58 thereby causing the flag 54 to assume its position as illustrated in FIG. 4. Therefore, when the scene brightness level is below the reference scene brightness level and a flash array 24 is inserted into the flash socket 22, the flag 54 is moved out of the field of view of the viewfinder 40 to provide the photographer with a clear view of the scene to be photographed. This feature of the electric control circuit 72 therefore provides the camera 10 with a simulated high scene brightness condition whenever a flash array 24 is inserted in the camera 10 and the scene brightness is below the threshold value.

It can be appreciated by those skilled in the art that the invention thus described has low power consumption characteristics because of the components selected and because current only flows through the coil 66 whenever the camera experiences a change in scene brightness going from either a high scene brightness condition to a low scene brightness condition, or from a low scene brightness condition to a high scene brightness condition, or when a simulated high scene brightness condition is created by the insertion of a flash array 24 into the flash socket 22. The obvious advantage of this type of low scene brightness indicator is that it is automatically turned on when a film cassette is present in the camera 10 and can be allowed to remain on without any operator intervention for relatively long periods of time. This feature therefore eliminates the problems sometimes associated with other types of low scene brightness indicators because the photographer only has to look through the viewfinder in order to get an indication of whether or not the low scene brightness condition exists.

Certain changes may be made in the above described embodiment without departing from the scope of the invention, and those skilled in the art may make still other changes according to the teachings of the present invention. Therefore, it is intended that all matter contained in the above description or shown in the accompanying drawings shall be interpreted as illustrative and not in a limiting sense.

What is claimed is:

1. Camera apparatus of the type which has a distinct ambient exposure mode of operation and a distinct flash exposure mode of operation in which the camera utilizes an artificial light source to illuminate a scene to be photographed, said apparatus comprising:

means for detecting the brightness of at least a portion of a scene to be photographed and providing an electrical output signal having a first characteristic whenever the scene brightness changes from a level below a predetermined reference scene brightness to a level at least equal to said predetermined reference scene brightness and having a second characteristic whenever the scene brightness changes from a level above said predetermined reference scene brightness to a level at least equal to said predetermined reference scene brightness, said predetermined reference scene brightness level defining a threshold scene brightness value above which said camera apparatus should be used in its ambient exposure mode of operation and below which said camera apparatus should be used in its flash exposure mode of operation with an artificial light source, said brightness detecting and output signal providing means comprising photodetector means for receiving light from said at least a portion of the scene to be photographed and providing an electrical output signal whose magnitude varies as a function of the intensity of the scene brightness and circuit means for continuously monitoring said electrical output signal of said photodetector means and for providing said electrical output signal having said first and said second characteristics wherein said output signal having said first characteristic comprises a first electrical pulse having a given polarity and wherein said output signal having said second characteristic comprises a second electrical pulse having a polarity opposite to that of said first electrical pulse; and a bistable magnetic indicator electrically energizable by said electrical output signal to provide a visual signal which indicates to a camera user which of said camera apparatus' exposure modes of operation should be used, said magnetic indicator being mounted with said camera apparatus for movement between a first stable position which indicates that said camera apparatus should be used in its flash exposure mode of operation with an artificial light source and a second stable position which indicates that said camera apparatus can be used in its ambient exposure mode of operation, said magnetic indicator being movable into its said first stable position in response to said electrical output signal when it has its said second characteristic and into its said second stable position in response to said electrical output when it has its said first characteristic.

2. The apparatus of claim 1 further including viewfinder means having a field of view generally coextensive with the field of view of said camera apparatus for facilitating the aiming of said camera apparatus to frame the subject matter of a scene to be photograhed.

3. The apparatus of claim 2 wherein said indicator includes a transparent flag at least a portion of which is visible within said field of view of said viewfinder means when said indicator is in its said first stable position and which is not visible when said indicator is in its said second stable position.

4. The apparatus of claim 3 wherein said transparent flag is structured to fill the entire field of view of said viewfinder means when said indicator is in its said first stable position.

5. The apparatus of claim 1 wherein said photodetector means comprises a reversed biased photodiode.

6. The apparatus of claim 1 wherein said circuit means comprises:

a capacitor for storing electrical energy, said capacitor being electrically coupled with said bistable magnetic indicator to provide said first electrical pulse as said capacitor is charged and said second electrical pulse as said capacitor is discharged;

a level detector for continuously monitoring said electrical output signal of said photodetector means, said level detector being set to trigger at said predetermined reference scene brightness;

amplifier means electrically coupled with the output stage of said level detector for amplifying the output of said level detector; and transistor switching means coupled with said amplifier means and said capacitor for alternately connecting said capacitor to a voltage source to charge said capacitor or to a conductive path to discharge said capacitor in accordance with the output of said amplifier means.

7. The apparatus of claim 6 further including electrical means coupled to the output stage of said level detector and responsive to the insertion of an artificial light source into said camera apparatus when said indicator indicates that said camera apparatus should be used in its flash exposure mode of operation for changing the input of said amplifier means so that said amplifier means and said transistor switching means cause said capacitor to provide said first electrical pulse regardless of the intensity of the scene brightness thereby causing said bistable magnetic indicator to assume its said second stable position whenever an artificial light source is operatively connected with said camera apparatus.

8. The apparatus of claim 7 wherein said photodetector means comprises a reversed biased photodiode for providing said continuous electrical output signal.

9. The apparatus of claim 1 further including means responsive to the insertion of an artificial light source into said camera apparatus when said indicator indicates that said camera apparatus should be used in its flash exposure mode of operation for causing said brightness detecting and output signal causing means to provide said electrical output signal with said first characteristic regardless of the intensity of the scene brightness thereby causing said bistable magnetic indicator to assume its said second stable position whenever an artificial light source is operatively connected with said camera apparatus.

10. Camera apparatus of the type which has a distinct ambient exposure mode of operation and a distinct flash exposure mode of operation in which the camera utilizes an artificial light source to illuminate a scene to be photographed, said apparatus comprising:

viewfinder means having a field of view generally coextensive with the field of view of said camera apparatus for facilitating the aiming of said camera apparatus to frame the subject matter of a scene to be photographed;

photodetector means for detecting the brightness of at least a portion of the scene to be photographed and providing an electrical output signal whose magnitude varies as a function of the intensity of the scene brightness;

electrical circuit means for continuously monitoring said electrical output signal of said photodetector means and for providing a first electrical pulse having a given polarity whenever the scene brightness changes from a level below a predetermined reference scene brightness to a level at least equal to said predetermined scene brightness and a second electrical pulse having a polarity opposite to that of said first electrical pulse whenever the scene brightness changes from a level above said predetermined reference scene brightness to a level at least equal to said predetermined reference scene brightness, said predetermined reference scene brightness defining a threshold scene brightness value above which said camera apparatus should be used in its ambient exposure mode of operation and below which said camera apparatus should be used in its flash exposure mode of operation with an artificial light source;

a bistable magnetic indicator electrically energizable by said electrical pulses to provide a visual signal in said field of view of said viewfinder means which indicates to a camera user which of said camera apparatus' exposure modes of operation should be used, said magnetic indicator being mounted in said viewfinder means for movement between a first stable position in which at least a portion of said indicator is observable within said field of view of said viewfinder means to indicate that said camera apparatus should be used in its flash exposure mode of operation with an artificial light source and a second stable position out of said field of view of said viewfinder means thereby providing a clear view of a scene to be photographed and indicating that said camera apparatus can be used in its ambient exposure mode of operation, said magnetic indicator being movable into said first stable position in response to said second electrical pulse and into said second stable position in response to said first electrical pulse.

11. The apparatus of claim 10 wherein said observable portion of said indicator comprises a transparent colored flag which covers at least part of said field of view of said viewfinder means when said indicator is in its said first stable position.

12. The apparatus of claim 11 wherein said transparent flag comprises a red colored flag which fills the entire field of view of said viewfinder means.

13. The apparatus of claim 10 further including means responsive to the insertion of an artificial light source into said camera apparatus when said indicator indicates that said camera apparatus should be used in its flash exposure mode of operation for causing said electrical circuit means to provide said first electrical pulse regardless of the intensity of the scene brightness thereby causing said bistable magnetic indicator to assume its said second stable position whenever an artificial light source is operatively connected with said camera apparatus.

14. The apparatus of claim 10 wherein said photodetector means comprises a reversed biased photodiode for providing said electrical output signal.

15. The apparatus of claim 10 wherein said electrical circuit means comprises:

a capacitor for storing electrical energy, said capacitor being electrically coupled with said bistable magnetic indicator to provide said first electrical pulse as said capacitor is charged and said second electrical pulse as said capacitor is discharged;

a level detector for continuously monitoring said electrical output signal of said photodetector means, said level detector being set to trigger at said predetermined reference scene brightness;

amplifier means electrically coupled with the output stage of said level detector for inverting and amplifying the output of said level detector; and transistor switching means coupled with said amplifier means and said capacitor for alternately connecting said capacitor to a voltage source to charge said capacitor or to a conductive path to discharge said capacitor in accordance with the output of said amplifier means.

16. The apparatus of claim 15 further including electrical means coupled to the output stage of said level detector and responsive to the insertion of an artificial light source into said camera apparatus when said indicator indicates that said camera apparatus should be used in its flash exposure mode of operation for changing the input of said amplifier means so that said amplifier means and said transistor switching means cause said capacitor to provide said first electrical pulse regardless of the intensity of the scene brightness thereby causing said bistable magnetic indicator to assume its said second stable position whenever an artificial light source is operatively connected with said camera apparatus.

17. The apparatus of claim 15 wherein said photodetector means comprises a reversed biased photodiode for providing said continuous electrical output signal.

18. Camera apparatus of the type which has a distinct ambient exposure mode of operation and a distinct flash exposure mode of operation in which the camera utilizes an artificial light source to illuminate a scene to be photographed, said apparatus comprising:

means for detecting the brightness of at least a portion of a scene to be photographed and providing an electrical output signal having a first characteristic whenever the scene brightness changes from a level below a predetermined reference scene brightness to a level at least equal to said predetermined reference scene brightness and having a second characteristic whenever the scene brightness changes from a level above said predetermined reference scene brightness to a level at least equal to said predetermined reference scene brightness, said predetermined reference scene brightness level defining a threshold scene brightness value above which said camera apparatus should be used in its ambient exposure mode of operation and below which said camera apparatus should be used in its flash exposure mode of operation with an artificial light source; and a bistable magnetic indicator electrically energizable by said electrical output signal to provide a visual signal which indicates to a camera user which of said camera apparatus' exposure modes of operation should be used, said magnetic indicator being structured and mounted with said camera apparatus for movement between a first stable position in which said magnetic indicator remains without power applied thereto and which indicates that said camera apparatus should be used in its flash exposure mode of operation with an artificial light source and a second stable position in which said magnetic indicator remains without power applied thereto and which indicates that said camera apparatus can be used in its ambient exposure mode of operation, said magnetic indicator being movable into its said first stable position in response to said electrical output signal when it has its said second characteristic and into its said second stable position in response to said electrical output when it has its said first characteristic.

* * * * *